Aug. 11, 1942.   P. HILPMAN   2,293,000

TYPOGRAPHICAL COMPOSING MACHINE

Filed July 10, 1941

INVENTOR
Paul Hilpman
BY
ATTORNEYS

Patented Aug. 11, 1942

2,293,000

UNITED STATES PATENT OFFICE 2,293,000

TYPOGRAPHICAL COMPOSING MACHINE

Paul Hilpman, Garden City, N. Y., assignor to Mergenthaler Linotype Company, a corporation of New York Application July 10, 1941, Serial No. 401,727

9 Claims. (Cl. 199—29)

This invention relates to typographical composing machines of the general organization represented in U. S. Letters Patent to O. Mergenthaler, No. 436,532, wherein circulating matrices are released from a storage magazine in the order in which their characters are to appear in print and then assembled in line, the composed line transferred to the face of a slotted mold for the casting of a type bar or slug, and the matrices thereafter returned by distributing mechanism to the magazine from whence they started.

In these machines, the matrices, after being released from the magazine, are delivered one after another, in the order of their release, to an assembler wherein they are composed in line in upright position under the stacking influence of a rapidly rotating star wheel. The assembler usually employed in such machines comprises front and rear side walls having rails upon which the matrices are supported by their lower ears; and to permit access to a composed line, the front wall of the assembler is provided with a movable gate which may be sprung forwardly by the operator. The leading or foremost matrix in the line is maintained in upright position within the line by a so-called line resistant, which is pushed ahead by the gradually advancing line, while the last or hindmost matrix is maintained upright by a pair of spring-pressed pawls provided at the entrance of the assembler.

After a line of matrices has been composed therein, the assembler is raised to position the line between a pair of depending fingers on a line delivery slide, which thereupon shifts the line horizontally from the assembler to the casting mechanism.

As the assembler is raised, its spring-pressed pawls travel upwardly with it, of course, and so support the last or terminal matrix in the line. The line resistant, however, is mounted independently of the assembler and remains behind in the position to which it was advanced during the composition of the line, later (after the line has been raised above it) being returned automatically to its initial or line receiving station. Due to the fact that the line resistant does not travel upwardly with the assembler, the left finger on the line delivery slide is made long enough and positioned on the slide so that it receives and supports the leading or foremost matrix of the composed line after the line has been raised beyond the range of the line resistant. Under these conditions, therefore, it becomes necessary for the operator to reset or relocate the long finger on the line delivery slide with each change of line measure of the slug to be cast. Aside from the fact that the time consumed by the operator in making such adjustments adversely affects the output of the machine, the operator frequently neglects to position the long finger on the slide to accord with the length of the line to be cast in which case, when the assembler is raised, the leading or foremost matrix in the line contained therein might topple over for lack of support in the event the finger is positioned too far to the left or the matrices might jam against the lower end of the finger in case it was positioned too far to the right.

In accordance with the present invention, the above and other objections are obviated by providing the assembler with means which act independently of the long finger on the line delivery slide for supporting in upright position the leading or foremost matrix in the line during the travel of the assembler from its line receiving to its line transfer station. In the embodiment illustrated, the means so employed includes the movable gate which, as above stated, is provided to permit access to a composed line of matrices in the assembler. Ordinarily, this gate comprises a flat plate or bar pivotally secured to the front wall of the assembler by means of a pair of arms; and normally it is held in vertical alignment with the inner face of the front wall of the assembler and in front of the upper front projecting ears on the matrices in the composed line.

In carrying out the invention, the inner face of the gate is so tapered throughout its length that the distance between it and the oppositely disposed inner face of the rear wall of the assembler decreases gradually, starting from the line receiving end of the assembler. During the assembly of a line, the gate is held forward against the action of a spring so that its tapered inner face is out of the path traveled by the upper front projecting ears of the matrices being composed. After assembly, however, and as the line is raised by the assembler above the level of the line resistant, the lock which holds the gate forward is released, whereupon the spring acts to force the gate rearwardly, with the result that the upper ears on the leading or foremost matrix in the line become frictionally engaged between the tapered inner face of the gate and the oppositely disposed face of the rear wall of the assembler. Hence, it is thus possible to permanently locate the long finger on the line delivery slide to accord with the longest line capable of being cast in the machine, and to depend on the assembler gate for maintaining the leading or foremost matrix in the line in upright position as the assembler is raised from its line receiving to its line transfer station.

For a more complete description of the invention reference may be made to the accompanying drawing. In this drawing, however, the invention has been shown merely by way of example and in preferred form, and obviously many variations and modifications may be made therein which will still be comprised within its spirit. It is to be understood, therefore, that the invention is not limited to any specific form or embodiment, except insofar as such limitations are specified in the appended claims.

Referring to the drawing.

Figure 1:
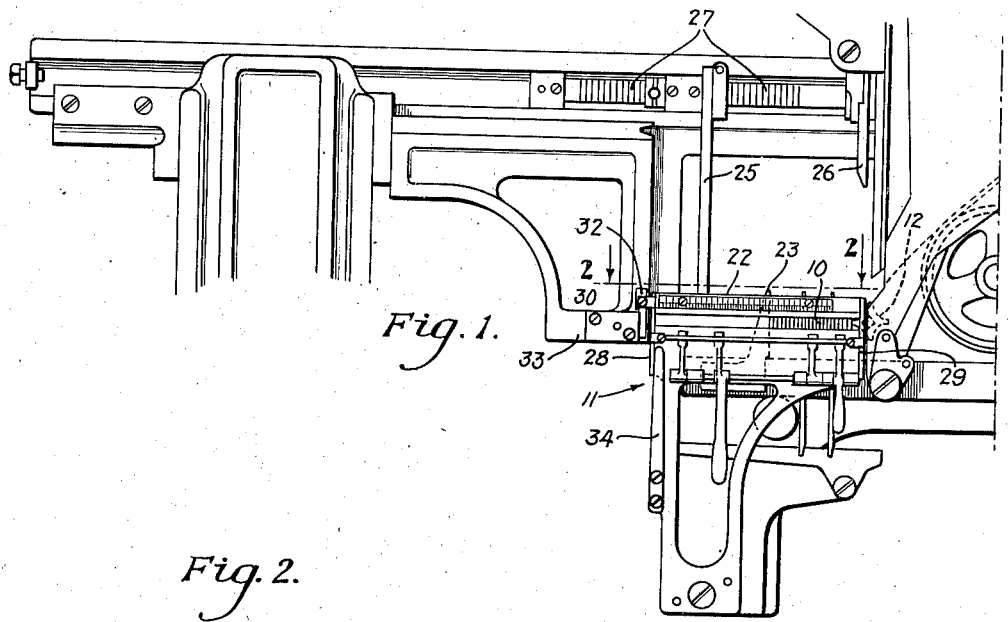
Figure 1 is a front elevation of a portion of a typographical composing machine equipped with the present improvements.

As usual, the matrices 10, after being released from a storage magazine (not shown), are delivered one after another, in the order of their release, to an assembler 11 wherein they are composed in line in upright position under the influence of a rapidly rotating star wheel 12. The matrices are of the customary two-letter variety, bearing on their casting edges two superposed characters 13, 14 and provided with upper and lower projecting ears 15, 16, by means of which they are supported in the machine as they circulate therethrough.

Figure 2:
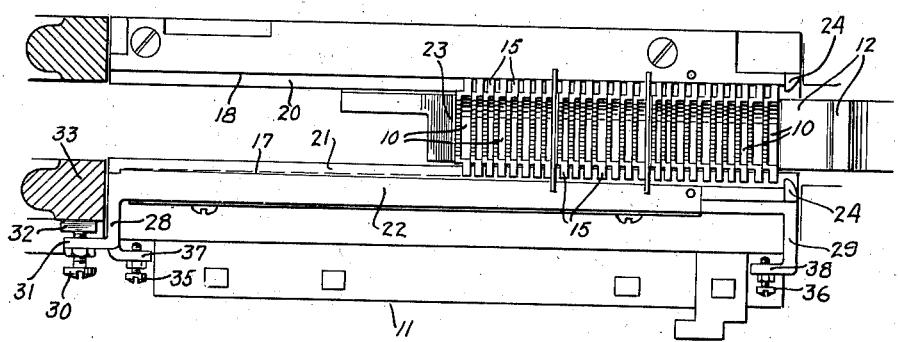
Figure 2 is a horizontal sectional view on line 2—2 of Figure 1.
Figure 3:
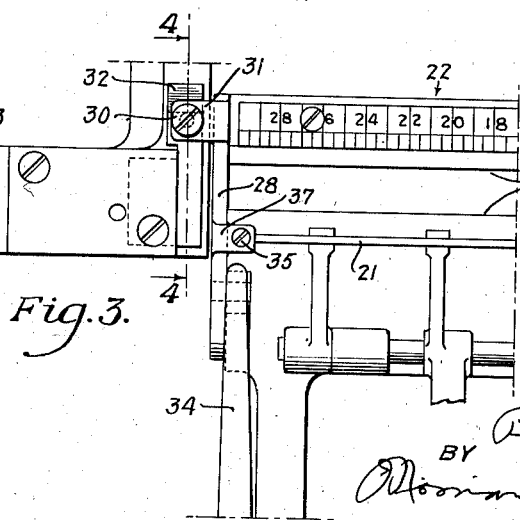
Figure 3 is an enlarged front elevation of the assembler incorporating the present improvements.
Figure 4:
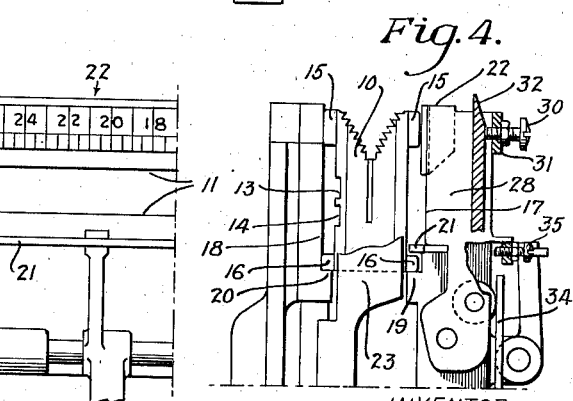
Figure 4 is a vertical view, in section, on line 4—4 of Figure 3.

The assembler 11, is will be noted (Figs. 2 and 4), presents a straight parallel-sided channel wherein the matrices 10 are assembled in line and which is constituted generally by front and rear side walls 17, 18 having a pair of fixed horizontally disposed rails 19, 20 upon which the matrices 10 are supported by their lower ears 16 when they are assembled at a lower level to bring the upper characters 13 thereon into casting position. The front wall 17 of the assembler 11 is also provided with a movable auxiliary rail 21 upon which the matrices 10 are supported by their lower front ears 16 when they are assembled at an upper level to bring the lower characters thereon into casting position. In addition, the front wall 17 of the assembler 11 is provided with a movable gate 22 that may be swung forwardly by the operator when access to the line in the assembler 11 is desired.

As the matrices 10 enter the assembler 11 at either level, the leading or foremost matrix in the line is maintained in upright position by a line resistant 23, and the assembler 11 is provided with a pair of spring-pressed pawls 24 arranged to engage the matrix last assembled in line.

After composition of a line has been completed, the assembler is raised to position the line between a pair of depending fingers 25, 26 carried by a line delivery slide 27, which thereupon shifts the line horizontally from the assembler 11 to the casting mechanism (not shown). During the ascent of the assembler 11, the spring-pressed pawls 24 thereon support the last or terminal matrix in the assembler 11 in vertical position.

Coming now to the present invention, the movable gate 22 carried by the front wall 17 of the assembler 11 is utilized to support, independently of the long finger 25 on the line delivery slide 27, the leading matrix in a composed line during the ascent of the assembler 11 from its line receiving to its line transfer station. The gate 22 is positioned above the fixed front wall 17 of the assembler 11 and it is pivotally secured thereto by means of a pair of vertically disposed arms 28, 29. The inner face of the gate 22 is so tapered that the distance between it and the oppositely disposed inner face of the rear wall 18 of the assembler 11 gradually decreases, starting from the line receiving end of the assembler. When the assembler 11 is in its lowermost or line receiving station, the gate 22 is held forwardly against the action of a leaf spring 34 with its tapered inner face out of the path traveled by the upper front ear 15 on the leading or foremost matrix of an incoming line, this being effected, in the present instance, by means of a cam plate 32 secured to the line delivery channel frame 33 and adapted to engage an adjusting screw 30 mounted in a bracket 31 carried by the gate 22. As the assembler 11 is raised from its line receiving station to its line transfer station, the adjusting screw 30 slides off the cam plate 32 and the spring 34 then acts to force the gate 22 rearwardly against the upper front ear 15 of the leading or foremost matrix 10 in the line, it being understood that the depth of the gate 22 is sufficient to accomplish this purpose regardless of whether the matrix is composed at the upper or lower level in the assembler. When thus engaged, the leading matrix is forced slightly to the rear until its rear upper ear 15 engages the inner face of the rear wall 18 of the assembler, whereby the matrix is frictionally engaged and so held securely in upright position.

Under these conditions, as previously stated, the long finger 25 on the line delivery slide 27 may be located permanently to accord with the longest line capable of being cast in the machine without danger of the leading or foremost matrix in a short line toppling over during the ascent of the assembler from its line receiving station to its line transfer station. In addition, when a short line has been composed (as in quadding), the gate 22 provides the support necessary to maintain the leading or foremost matrix in the line in proper upright position until it is carried against the long finger 25 during the transfer of the line from the assembler 11 to the casting mechanism.

After the line has been transferred from the assembler a pair of adjusting screws 35, 36, mounted in brackets 37, 38 carried by the arms 28, 29, engage the front face of the front wall 17 and so limit further inward movement of the gate 22 by the spring 34, and the gate remains in this position until the assembler descends to its line receiving position, whereupon the cam plate 32 engages the adjusting screw 30 and forces the gate 22 forwardly to its normal or line free position.

Having thus described my invention what I claim is:

1. In or for a typographical composing machine, the combination of an assembler wherein the matrices are composed in line in an upright position, said assembler being movable from its line receiving station to a line transfer station, a line delivery carriage for removing the composed line from the assembler when the latter is in its line transfer station and means distinct from the line delivery carriage and inoperative in the line receiving station of the assembler but rendered operative during the travel of the assembler from said station to its line transfer station for maintaining in upright position the leading matrix in the line.

2. In or for a typographical composing machine, the combination of an assembler wherein the matrices are composed in line in an upright position, said assembler being movable from its line receiving station to a line transfer station and return, and means carried by the assembler for maintaining in upright position the leading matrix in the line, said means being rendered operative during the travel of the assembler from its line receiving station to its line transfer station and then inoperative during the return of the assembler from its line transfer station to its line receiving station.

3. In or for a typographical composing machine, an assembler wherein the matrices are composed in line in an upright position, said assembler having a movable gate adapted to frictionally engage the leading or foremost matrix in the line to maintain it in upright position.

4. An assembler as set forth in claim 3 characterized in that said gate is provided with an inner face so tapered that the distance between it and the oppositely disposed inner face of the rear wall of the assembler decreases gradually, starting from the matrix receiving end of the assembler.

5. In or for a typographical composing machine, the combination of an assembler wherein the matrices are composed in line in an upright position, said assembler having rear and front side walls and a movable gate on the front wall, means for holding said gate out of the path of the matrices during line composition, and means for forcing said gate rearwardly to frictionally engage the leading or foremost matrix in the line during the travel of the assembler from its line receiving station to its line transfer station.

6. In or for a typographical composing machine, the combination of an assembler wherein the matrices are composed in line in an upright position, said assembler having rear and front side walls and a movable gate on the front wall, means for forcing said gate rearwardly to frictionally engage the leading matrix of the line during the travel of said assembler from its line receiving station to its line transfer station, and means operable during the return of said assembler from its line transfer station to its line receiving station for forcing said gate out of the path of the matrices during line composition.

7. In or for a typographical composing machine, the combination of an assembler wherein the matrices are composed in line in an upright position, said assembler having rear and front side walls and a movable gate on the front wall, a spring normally urging said gate towards the rear wall, and means operable when said assembler is in its line receiving station for holding said gate forwardly against the action of said spring out of the path of the matrices during line composition.

8. An assembler for a typographical composing machine comprising fixed front and rear side walls, a movable gate having a tapered inner face and swingably connected to the front wall, means for urging said gate toward the rear wall, and adjustable means for limiting the distance the gate may be moved toward said rear wall.

9. An assembler for a typographical composing machine comprising fixed front and rear side walls, a movable gate pivotally mounted on the front wall and having an inner face so tapered that the distance between it and the oppositely disposed inner face of the rear wall decreases gradually from the receiving end of the assembler, means for urging said gate towards said rear wall, and means for limiting the distance said gate may be moved toward said rear wall.

PAUL HILPMAN.